(12) United States Patent
Yang et al.

(10) Patent No.: US 11,062,090 B2
(45) Date of Patent: Jul. 13, 2021

(54) METHOD AND APPARATUS FOR MINING GENERAL TEXT CONTENT, SERVER, AND STORAGE MEDIUM

(71) Applicant: BEIJING BAIDU NETCOM SCIENCE AND TECHNOLOGY CO., LTD., Beijing (CN)

(72) Inventors: Renkai Yang, Beijing (CN); Hao Wang, Beijing (CN); Ying Li, Beijing (CN); Yilin Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 153 days.

(21) Appl. No.: 16/213,490

(22) Filed: Dec. 7, 2018

(65) Prior Publication Data
US 2019/0220516 A1 Jul. 18, 2019

(30) Foreign Application Priority Data
Dec. 8, 2017 (CN) .......................... 201711297664.9

(51) Int. Cl.
*G06F 40/30* (2020.01)
*G06N 3/04* (2006.01)
(Continued)

(52) U.S. Cl.
CPC .......... *G06F 40/30* (2020.01); *G06F 16/3346* (2019.01); *G06F 16/90344* (2019.01);
(Continued)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| 9,940,361 B2 * | 4/2018 | Lee | ........................ G06F 16/951 |
| 10,536,579 B2 * | 1/2020 | Iyer | .......................... G06N 3/08 |

(Continued)

FOREIGN PATENT DOCUMENTS

| CN | 105630917 | 6/2016 |
| CN | 106156035 | 11/2016 |

(Continued)

OTHER PUBLICATIONS

Hao et al, An end-to-end model for question answering over knowledge base with cross-attention combining global knowledge, 2017, Proceedings of the 55th Annual Meeting of the Association for Computational Linguistics (vol. 1: Long Papers)}, pp. = 221-231 (Year: 2017).*

*Primary Examiner* — Lamont M Spooner
(74) *Attorney, Agent, or Firm* — Knobbe, Martens, Olson & Bear, LLP (57) ABSTRACT

A method and apparatus for mining general text content, a server, and a storage medium, are disclosed. A specific embodiment of the method can include: acquiring a question including a target subject and a target characteristic; and inputting the target subject, the target characteristic and a target text into a pre-constructed answer prediction model, and determining a starting position and an ending position of an answer to the question in the target text by the answer prediction model. The answer prediction model is pre-trained based on a sample question including a sample subject and a sample characteristic, and a starting position and an ending position of a sample answer in a text. In the technical solution provided by the embodiments of the present disclosure, the starting position and the ending position of the answer in the target text may be correctly predicted, thereby increasing the accuracy of answer recognition.

8 Claims, 6 Drawing Sheets

(51) Int. Cl.
    *G06F 16/903*     (2019.01)
    *G06N 3/00*     (2006.01)
    *G06N 3/08*     (2006.01)
    *G06F 16/33*     (2019.01)

(52) U.S. Cl.
    CPC ........... *G06N 3/006* (2013.01); *G06N 3/0445* (2013.01); *G06N 3/08* (2013.01)

(56) References Cited

U.S. PATENT DOCUMENTS

| | | | |
|---|---|---|---|
| 2008/0244375 A1* | 10/2008 | Gentile | G06F 16/367 715/205 |
| 2013/0332481 A1* | 12/2013 | Lau | G06F 16/2457 707/769 |
| 2016/0306897 A1* | 10/2016 | Huang | G06F 16/9024 |
| 2017/0032052 A1 | 2/2017 | Raman et al. | |
| 2017/0068903 A1* | 3/2017 | Hakkani-Tur | G06N 5/022 |
| 2017/0109355 A1* | 4/2017 | Li | G06N 3/0445 |
| 2017/0193094 A1* | 7/2017 | Tong | G06F 16/9024 |
| 2017/0213139 A1* | 7/2017 | Sawant | G06N 20/00 |
| 2017/0270421 A1* | 9/2017 | Frank | G06F 16/24578 |
| 2018/0039633 A1* | 2/2018 | Miyoshi | G06F 40/247 |
| 2018/0046938 A1* | 2/2018 | Allen | G06N 5/02 |
| 2018/0115645 A1* | 4/2018 | Iyer | G06Q 10/063112 |
| 2018/0300312 A1* | 10/2018 | Raiman | G06F 40/30 |
| 2018/0341686 A1* | 11/2018 | Hu | G06F 16/24575 |
| 2019/0043619 A1* | 2/2019 | Vaughan | G16H 20/10 |
| 2019/0080225 A1* | 3/2019 | Agarwal | G06F 16/35 |
| 2020/0042558 A1* | 2/2020 | Brave | G06F 16/288 |

FOREIGN PATENT DOCUMENTS

| | | |
|---|---|---|
| CN | 106649514 | 5/2017 |
| CN | 106776564 | 5/2017 |
| CN | 106991161 | 7/2017 |
| CN | 107291822 | 10/2017 |

\* cited by examiner

METHOD AND APPARATUS FOR MINING GENERAL TEXT CONTENT, SERVER, AND STORAGE MEDIUM

CROSS-REFERENCE TO RELATED APPLICATIONS

This application claims priority to Chinese Patent Application No. 201711297664.9, filed in China on Dec. 8, 2017, which is incorporated herein by reference in its entirety.

TECHNICAL FIELD

The present disclosure relates to the field of artificial intelligence technology, and specifically to a method and apparatus for mining general text content, a server, and a storage medium.

BACKGROUND

In the information age, as the Internet technology develops, the Internet is full of various and massive contents. For the question (Subject+Property, SP) constituted of a subject (S) and a property (P) of the subject in a knowledge graph, for example, the wife of Andy Lau, how to mine an answer (Object, O) wanted by a user from a short text is one of the problems currently urgent to be solved.

At present, the problem is generally solved using the following two answer mining techniques. 1) A conventional machine learning method. Different characteristics are manually built for different questions, resulting in a high extraction accuracy. Moreover, although models in some methods are not commonly used, the methods of training the models are commonly used. 2) A general solving method based on deep learning. A large number of training texts are inputted into a neural network, and a general analysis model may be obtained after learning and training. Thus, the answer is found.

Although the above two methods may mine the answer from the text, the efficiencies of the answer mining methods are low, and the accuracies of the answers to the question provided to the user are not high.

SUMMARY

Embodiments of the present disclosure provide a method and apparatus for mining general text content, a server, and a storage medium, which may improve the accuracy of recognizing the answer of a question extracted from text content.

In a first aspect, the embodiments of the present disclosure provide a method for mining general text content. The method includes:

acquiring a question including a target subject and a target characteristic; and inputting the target subject, the target characteristic and a target text into a pre-constructed answer prediction model, and determining a starting position and an ending position of an answer to the question in the target text by the answer prediction model, the answer prediction model being pre-trained based on a sample question including a sample subject and a sample characteristic, and a starting position and an ending position of a sample answer in a text.

In a second aspect, the embodiments of the present disclosure provide an apparatus for mining general text content. The apparatus includes:

a question acquiring module, configured to acquire a question including a target subject and a target characteristic; and an answer position determining module, configured to input the target subject, the target characteristic and a target text into a pre-constructed answer prediction model, and determine a starting position and an ending position of an answer to the question in the target text by the answer prediction model, the answer prediction model being pre-trained based on a sample question including a sample subject and a sample characteristic, and a starting position and an ending position of a sample answer in a text.

In a third aspect, the embodiments of the present disclosure provide a server. The server includes:

one or more processors; and a storage device, configured to store one or more programs, wherein the one or more programs, when executed by the one or more processors, cause the one or more processors to implement the method for mining general text content in the first aspect.

In a fourth aspect, the embodiments of the present disclosure provide a storage medium storing a computer program. The program, when executed by a processor, implements the method for mining general text content in the first aspect.

According to the method and apparatus for mining general text content, the server, and the storage medium provided by the embodiments of the present disclosure, by inputting the acquired question including the target subject and the target characteristic and the target text into the pre-constructed answer prediction model, the starting position and the ending position of the answer in the target text may be correctly predicted, thereby increasing the accuracy of answer recognition. At the same time, since characteristics of a knowledge base are added, the accuracy of extracting the answer of the question from the text content may be improved.

BRIEF DESCRIPTION OF THE DRAWINGS

After reading detailed descriptions of non-limiting embodiments given with reference to the following accompanying drawings, other characteristics, objectives, and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the present disclosure. In addition, it should be noted that, for the ease of description, only the parts related to the present disclosure are shown in the accompanying drawings.

Embodiment 1

Figure 1:
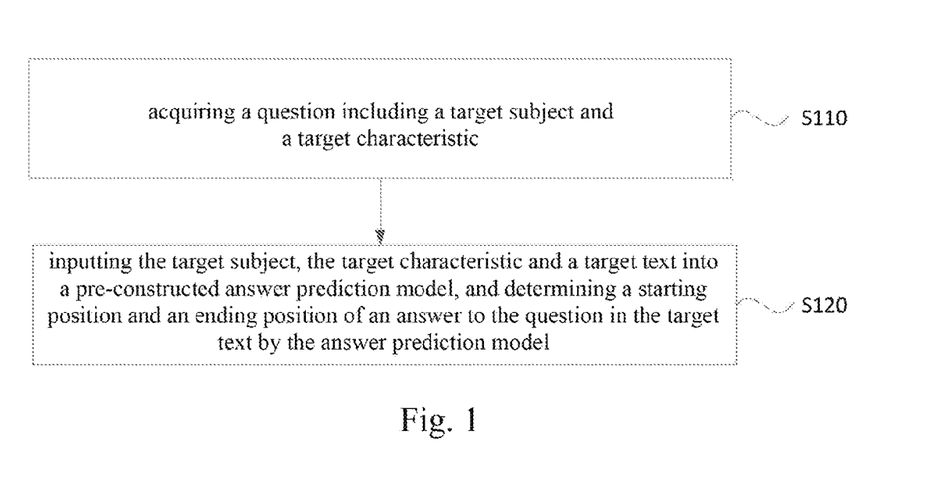
FIG. 1 is a flowchart of a method for mining general text content provided in Embodiment 1 of the present disclosure.
Figure 2:
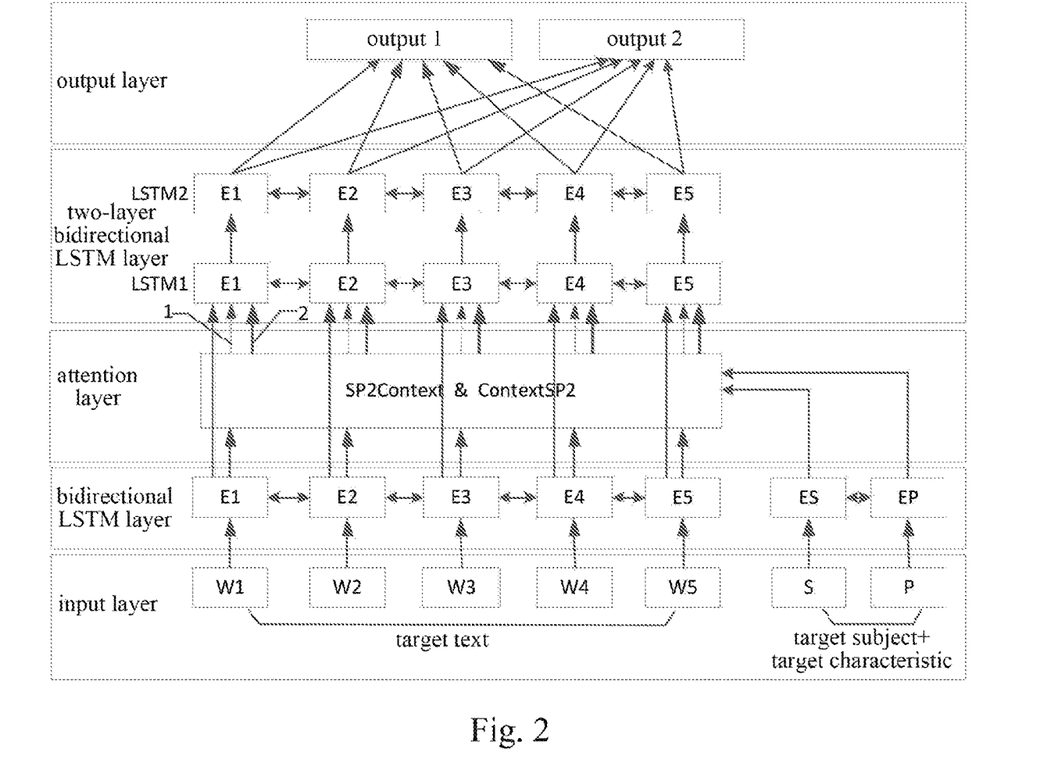
FIG. 2 is a schematic structural diagram of an answer prediction model provided in Embodiment 1 of the present disclosure.

FIG. 1 is a flowchart of a method for mining general text content provided in Embodiment 1 of the present disclosure. FIG. 2 is a schematic structural diagram of an answer prediction model provided in Embodiment 1 of the present disclosure. Based on characteristics of a knowledge base and deep learning, this embodiment may be used in a situation where an answer to a question given by a user is mined in a target text. The method may be performed by an apparatus for mining general text content/server/computer readable storage medium provided by embodiments of the present disclosure, and the apparatus/server/computer readable storage medium may be implemented by means of software and/or hardware. Referring to FIG. 1, the method includes the following steps.

S110, acquiring a question including a target subject and a target characteristic.

In this embodiment, after the target question raised by the user is acquired, by matching the target question with subjects in a knowledge graph, the matching subject is used as the target subject. By matching the target question with properties of the target subject, a characteristic of the matching property is used as the target characteristic. For example, in the target question of the wife of Andy Lau, the target subject is Andy Lau and the target characteristic is the wife.

S120, inputting the target subject, the target characteristic and a target text into a pre-constructed answer prediction model, and determining a starting position and an ending position of an answer to the question in the target text by the answer prediction model.

The answer prediction model is pre-trained based on a sample question including a sample subject and a sample characteristic, and a starting position and an ending position of a sample answer in a text.

In order to mine the answer from the text content, the answer to the question is extracted using a neural network, and the neural network model may include an input layer, an intermediate layer (i.e., a hidden layer), and an output layer. Based on factors such as the difficulty of training the model and the actual target situation, usually there is a plurality of hidden lays. The function of the hidden layer is mainly to increase the complexity of the neural network to enable a complex nonlinear relationship to be simulated. The process of training the neural network model is to input a large number of sample questions including sample subjects and sample characteristics and starting positions and ending positions of sample answers in texts into the neural network model for training. After trained by the samples, the model gradually possesses an extraction capability. When one sample question having an answer which position is to be determined and a target text are inputted into the trained neural network model as input samples, the model will make a prediction for the input sample in combination with existing parameters of the model, and output a prediction result. The target text refers to a short essay or news related to the searched question, which may be a text selected from internet products.

It should be noted that the answer prediction model in this embodiment is a boundary model, which provides, by outputting the starting position and the ending position of the answer in the text, a range where the answer corresponding to the question is located. The traditional prediction model for directly predicting the content of the answer relies heavily on the accuracy of word segmentation. If a word is not segmented correctly, the answer cannot be found. In contrast to the prediction model for directly predicting the content of the answer, the advantage of this boundary model lies in that the boundary model only needs to predict the starting position and the ending position. However, sequence tagging needs to correctly predict every position of the answer. In addition, it is verified by experiments that the accuracy and the efficiency of the answer prediction model in this embodiment are better.

Referring to FIG. 2, the answer prediction model may sequentially include the input layer, a bidirectional LSTM (Long Short-Term Memory) layer, an attention layer, a two-layer bidirectional LSTM layer, and the output layer. The attention layer is used to perform bidirectional matching between the question and the target text. LSTM is a special RNN (Recurrent Neural Network) model, which is proposed to solve the vanishing gradient problem of the RNN model. LSTM can compress input vector representation and predict an output.

In order to obtain a more accurate answer, the attention layer is introduced into the answer prediction model of this embodiment. The SP2Context in the attention layer represents that the question is used to match the text, and the ContextSP2 in the attention layer represents that the text is used to match the question, which may achieve the bidirectional matching between the question and the target text. Specifically, after a vector inputted into the attention layer is trained by the model, two results are outputted. As shown in FIG. 2, 1 represents the output of the SP2Context after being trained, and 2 represents the output of the ContextSP2 after being trained, thereby increasing the accuracy of the answer. At the same time, the two-layer bidirectional LSTM layer is used, so that the output layer finally outputs two results. The output 1 (i.e., the starting position of the answer in the text) is first predicted, and then the output 2 (i.e., the ending position of the answer in the text) is predicted, and thus, the answer of the question may be predicted.

The neural network model performs training on vectors. Therefore, in order to determine the starting position and the ending position of the answer to the question in the target text, first, a word segmentation operation needs to be performed on the inputted target text. The target text is segmented into respective words (W), and a word vector corresponding to each word, a vector corresponding to the target subject, and a vector corresponding to the target characteristic are inputted into the answer prediction model. After the vectors are trained by the model, the starting position and the ending position of the answer may be predicted.

In the method for mining general text content provided by the embodiment of the present disclosure, by inputting the acquired question including the target subject and the target characteristic and the target text into the pre-constructed answer prediction model, the starting position and the ending position of the answer in the target text may be accurately predicted, thereby increasing the accuracy of the answer recognition. At the same time, since characteristics of the knowledge base are added, the accuracy of extracting the answer to the question from the text content may be increased.

Embodiment 2

Figure 3:
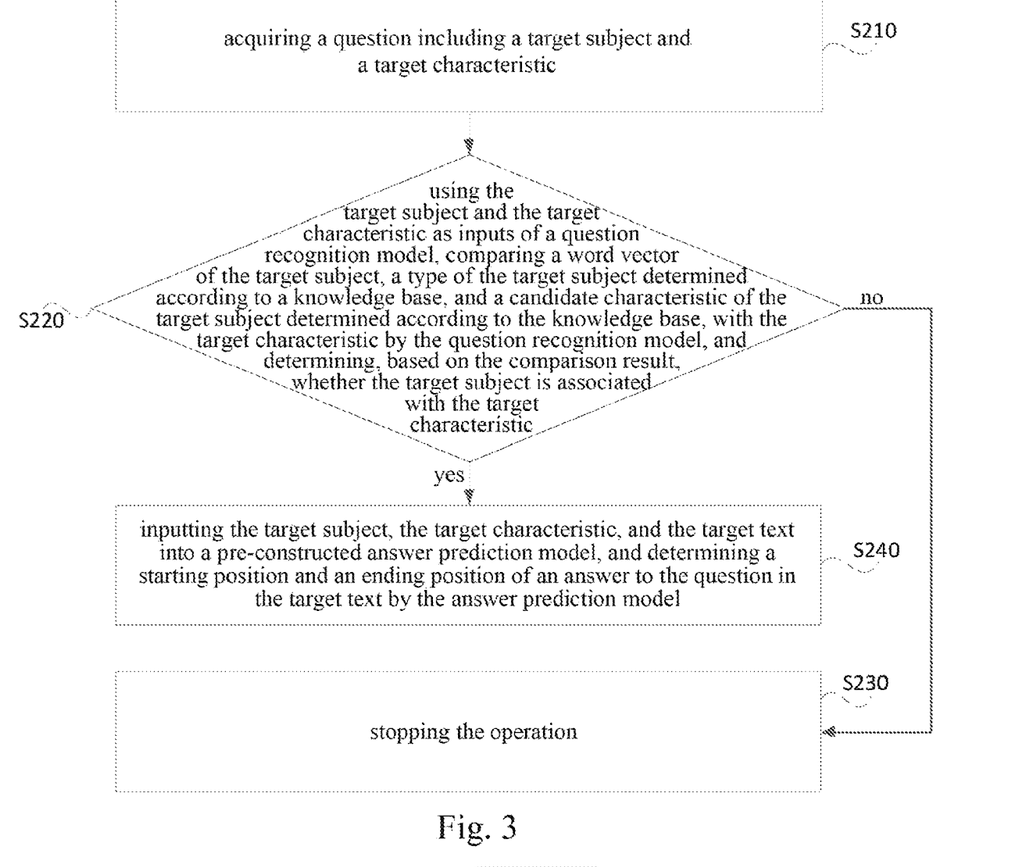
FIG. 3 is a flowchart of a method for mining general text content provided in Embodiment 2 of the present disclosure.
Figure 4:
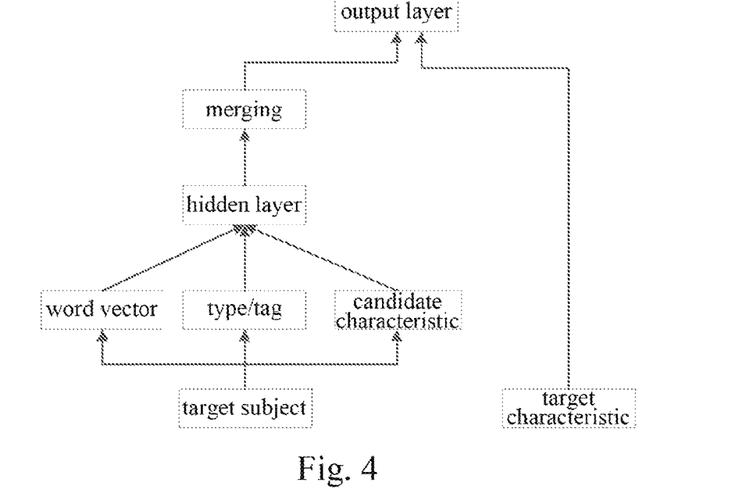
FIG. 4 is a schematic structural diagram of a question recognition model provided in Embodiment 2 of the present disclosure.

FIG. 3 is a flowchart of a method for mining general text content provided in Embodiment 2 of the present disclosure. FIG. 4 is a schematic structural diagram of a question recognition model provided in Embodiment 2 of the present disclosure. In order to improve the accuracy of mining the text, on the basis of Embodiment 1 of the present disclosure, the method for mining general text content further adds a step of recognizing the question after the acquiring a question including a target subject and a target characteristic. In combination with FIG. 3 and FIG. 4, the method includes the following steps.

S210, acquiring a question including a target subject and a target characteristic.

S220, using the target subject and the target characteristic as inputs of a question recognition model, comparing a word vector of the target subject, a type of the target subject determined according to a knowledge base, and a candidate characteristic of the target subject determined according to the knowledge base, with the target characteristic by the question recognition model, and determining, based on the comparison result, whether the target subject is associated with the target characteristic. If the target subject is not associated with the target characteristic, step S230 is performed. If the target subject is associated with the target characteristic, step S240 is performed.

According to the existing method of mining an answer from a text, as long as a question is provided, an answer to the question is given. However, for some inappropriate questions such as Andy Lau+area, the prediction is also performed, resulting in a low mining efficiency. Therefore, in order to improve the efficiency of answer recognition, first, it is necessary to ensure that the question constructed with the target subject and the target characteristic is accurate. In this implementation, the question recognition model is constructed. Before the prediction on the answer of the question is made, whether the combination of the target subject and the target characteristic is appropriate is first verified by the question recognition model.

Specifically, a large number of positive samples and a large number of negative samples are inputted into the neural network model for training. A distance of a correct characteristic is minimized, and a distance of an incorrect characteristic is maximized. By training and optimizing the samples, the model gradually possesses a capability to determine. When a characteristic and a subject having a to-be-determined result of the association between the subject and the characteristic are inputted into the trained neural network model as input samples, the model performs determination on the input samples in combination with the existing parameters of the model, and outputs the result of the determination. A positive sample may refer to that a certain property of the subject is used as a predicting property, and a negative sample may refer to that a property randomly found from a property set which does not belongs to the properties of the type of subject is used as a predicting property.

The question recognition model constructed in this embodiment is as shown in FIG. 4. The type/tag of the target subject represents a type to which the target subject belongs. The knowledge base contains many types/tags, for example, may contain icon and entertainment. Specifically, when the subject is Andy Lau, corresponding types/tags may be "entertainer," "music icon," "entertainment icon," "singer," "male singer," "producer," "actor," "musician," "cultural icon," or the like. That is, the same subject may correspond to different types/tags.

After the type/tag of the target subject is determined, for example, the type of the target subject Andy Lau is the singer, candidate characteristics at this time are all properties corresponding to the singer. For example, the candidate characteristics may contain: "date of birth," "talent agency," "belief," "representative works," "school," "alias," "Chinese name," "birthplace," "career," "wife," "Chinese zodiac," "ethnic group," "global fan club," "foreign name," "major achievement," "star sign," "daughter," "blood type," "nationality," "body height," "body weight," "language," "category," "native place," "marital status," "English name," "age," "publication date," "religious belief," "father," "educational background," and the like. When the type of the target subject Jackie Chan is actor, candidate characteristics at this time are all properties corresponding to the actor, and the candidate characteristics may contain: "representative works," "filmography," and "drama series," and the like. That is, different subjects may correspond to different types/tags, and different types/tags may correspond to different properties.

For example, when the target subject Andy Lau and the target characteristic <Infernal Affairs> are inputted into the question recognition model, the question recognition model first converts the target subject Andy Lau into a corresponding word vector, and determines the type corresponding to the target subject Andy Lau (e.g., the actor) and all properties (i.e., characteristics) of the target subject Andy Lau according to a subject relationship in the knowledge base. Then, the word vector, the type, and the characteristics, after being merged by the model through relevant processing, are compared with the given target characteristic <Infernal Affairs>. Thus, it may be obtained that the target subject Andy Lau is related with the target characteristic "Infernal Affairs".

When the target subject Andy Lau and the target characteristic area are inputted into the question recognition model, the question recognition model first converts the target subject Andy Lau into a corresponding word vector, and determines the type corresponding to the target subject Andy Lau (e.g., the actor) and all properties (i.e., the characteristics) of the target subject Andy Lau according to the subject relationship in the knowledge base. Then, the word vector, the type, and the characteristics, after being merged by the model through relevant processing, are compared with the given target characteristic area. Thus, it may be obtained that the target subject Andy Lau is not related with the target characteristic area.

S230, stopping the operation.

When the output result of the model is that the target subject is not associated with the target characteristic, the prediction on the answer to the question is stopped, and the user is reminded that the question itself is incorrect. For example, the apparatus for mining general text content may be provided with a display module, and the module may be integrated with a display screen, a microphone, etc. By displaying a word, broadcasting voices, or the like, the user may be informed that the question needs to be modified, or the question is incorrect.

If it is verified by the question recognition model that the target subject is associated with the combination of the target characteristics, step S240 of the subsequent answer prediction is performed.

S240, inputting the target subject, the target characteristic, and a target text into a pre-constructed answer prediction model, and determining a starting position and an ending position of an answer to the question in the target text by the answer prediction model.

The answer prediction model is pre-trained based on a sample question including a sample subject and a sample characteristic, and a starting position and an ending position of a sample answer in a text.

According to the method for mining general text content provided by the embodiment of the present disclosure, the question recognition model is introduced before the answer to the question is determined, thus filtering out a poor-quality question (i.e., a question in which the target subject is not associated with the target characteristic). Then, the starting position and the ending position of the answer to the question in the target text is determined by the constructed answer prediction model, thereby increasing the accuracy of answer recognition, and improving the accuracy of extracting the answer of the question from the text content at the same time.

Embodiment 3

Figure 5:
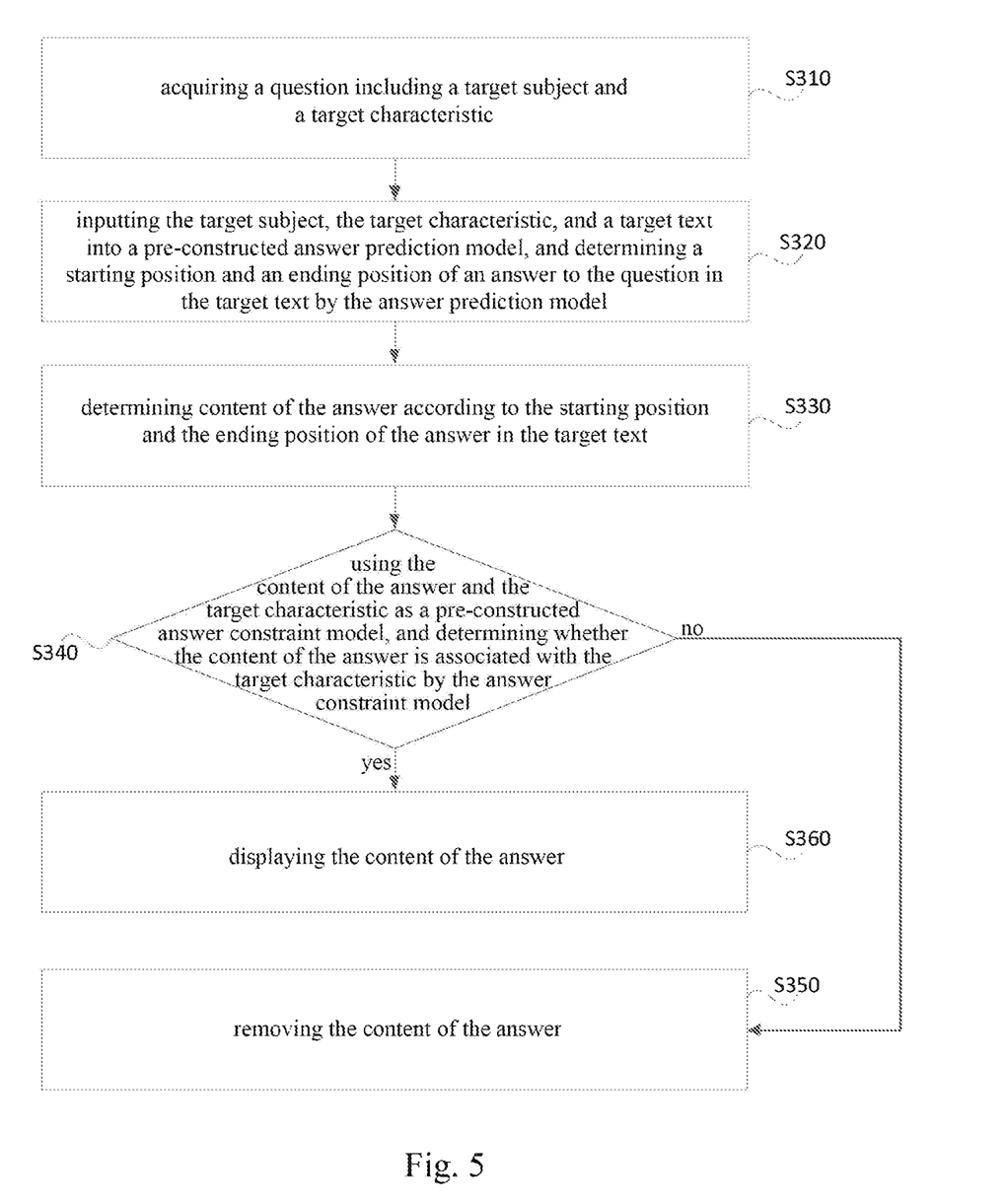
FIG. 5 is a flowchart of a method for mining general text content provided in Embodiment 3 of the present disclosure.
Figure 6:
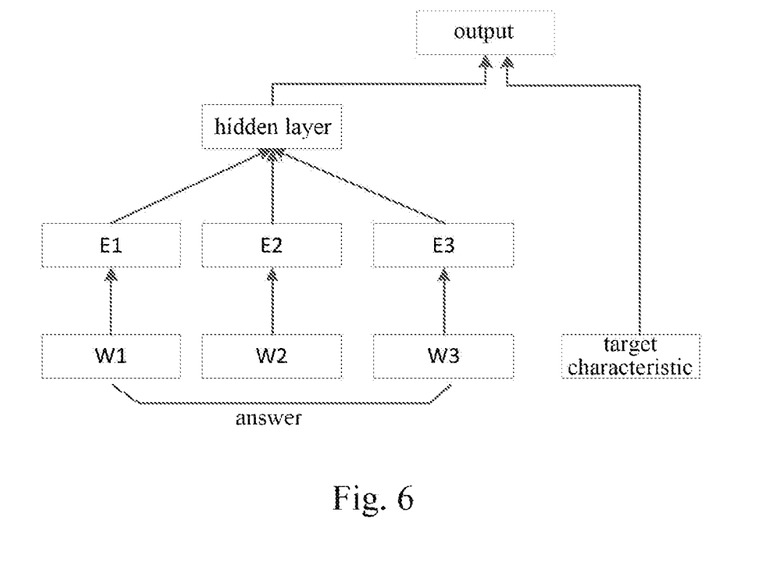
FIG. 6 is a schematic structural diagram of an answer constraint model provided in Embodiment 3 of the present disclosure.

FIG. 5 is a flowchart of a method for mining general text content provided in Embodiment 3 of the present disclosure. FIG. 6 is a schematic structural diagram of an answer constraint model provided in Embodiment 3 of the present disclosure. In order to improve the accuracy of mining the text, on the basis of the above embodiments of the present disclosure, the method for mining general text content further adds a step of discriminating the question after the determining a starting position and an ending position of an answer of the question in the target text by the answer prediction model. In combination with FIG. 5 and FIG. 6, the method includes the following steps.

S310, acquiring a question including a target subject and a target characteristic.

S320, inputting the target subject, the target characteristic, and a target text into a pre-constructed answer prediction model, and determining a starting position and an ending position of an answer to the question in the target text by the answer prediction model.

The answer prediction model is pre-trained based on a sample question including a sample subject and a sample characteristic, and a starting position and an ending position of a sample answer in a text.

S330, determining content of the answer based on the starting position and the ending position of the answer in the target text.

The starting position and the ending position of the answer in the target text may be determined according to the constructed answer prediction model. However, in some actual situations, the extracted answer is not in conformity with the answer wanted by the user. For example, when the question is Andy Lau+date of birth, the user wants to obtain the date of birth of Andy Lau. However, the answer extracted from the sentence that Andy Lau was born in New Territories in Hong Kong on Sep. 27, 1961 is New Territories which is not the answer wanted by the user. Therefore, in order to ensure the accuracy of subsequent extraction results, in this embodiment, an answer constraint model is constructed based on the existing answers of the characteristics to further define the extracted answer. First, the content of the answer should be determined according to the starting position and the ending position of the answer in the target text.

S340, using the content of the answer and the target characteristic as a pre-constructed answer constraint model, and determining whether the content of the answer is associated with the target characteristic by the answer constraint model. If the content of the answer is not associated with the target characteristic, step S350 is performed. If the content of the answer is associated with the target characteristic, step S360 is performed.

Specifically, the answer constraint model is as shown in FIG. 6. The content of the answer is segmented to respective words, a word vector corresponding to each word and the target characteristic are inputted into the answer prediction model to train. When the output result of the answer constraint model is that the content of the answer is not associated with the target characteristic, the content of the answer is removed, that is, step S350 is performed, and the user is reminded that the content of the answer is incorrect. For example, the apparatus for mining general text content may be provided with a display module, and the module may be integrated with a display screen, a microphone, etc. By displaying a word, broadcasting voices, or the like, that the content of the answer corresponding to the question is incorrect may be informed. If the content of the answer is associated with the target characteristic, the content of the answer is displayed by the display module.

S350, removing the content of the answer.

S360, displaying the content of the answer.

According to the method for mining general text content provided by the embodiment of the present disclosure, after the starting position and the ending position of the answer to the question in the target text are determined by the answer prediction model, the answer constraint model is introduced to verify whether the content of the answer determined by the starting position and the ending position of the answer in the target text is associated with the target characteristic. If the content of the answer is not associated with the target characteristic, the content of the answer is removed, thereby improving the accuracy of extracting the answer of the question from the text content.

Embodiment 4

Figure 7:
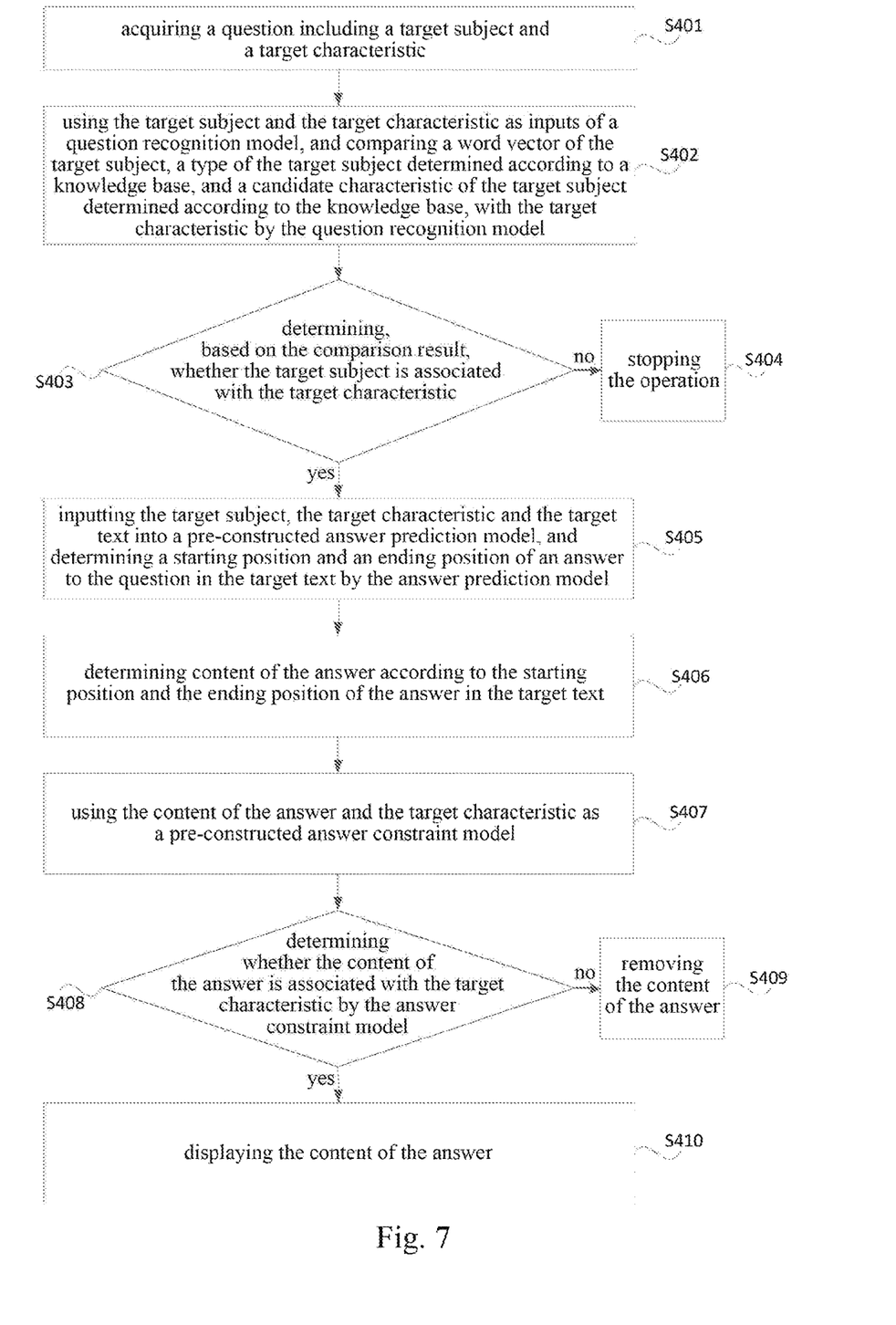
FIG. 7 is a flowchart of a method for mining general text content provided in Embodiment 4 of the present disclosure.

FIG. 7 is a flowchart of a method for mining general text content provided in Embodiment 4 of the present disclosure. Embodiment 4 is a preferable embodiment provided by the present disclosure on the basis of the above embodiments. Specifically, referring to FIG. 7, the method includes the following steps.

S401, acquiring a question including a target subject and a target characteristic.

S402, using the target subject and the target characteristic as an input of a question recognition model, and comparing a word vector of the target subject, a type of the target subject determined according to a knowledge base, and a candidate characteristic of the target subject determined according to the knowledge base, with the target characteristic by the question recognition model.

S403, determining, based on the comparison result, whether the target subject is associated with the target characteristic. If the target subject is not associated with the target characteristic, step S404 is performed. If the target subject is associated with the target characteristic, step S405 is performed.

S404, stopping the operation.

S405, inputting the target subject, the target characteristic and a target text into a pre-constructed answer prediction model, and determining a starting position and an ending position of an answer to the question in the target text by the answer prediction model.

The answer prediction model is pre-trained according to a sample question including a sample subject and a sample characteristic, and a starting position and an ending position of a sample answer in a text.

S406, determining content of the answer based on the starting position and the ending position of the answer in the target text.

S407, using the content of the answer and the target characteristic as a pre-constructed answer constraint model.

S408, determining whether the content of the answer is associated with the target characteristic by the answer constraint model. If the content of the answer is not associated with the target characteristic, step S409 is performed. If the content of the answer is associated with the target characteristic, step S410 is performed.

S409, removing the content of the answer.

S410, displaying the content of the answer.

According to the method for mining general text content provided by the embodiment of the present disclosure, the question recognition model is introduced before the answer of the question is determined, thus filtering out a poor-quality question (i.e., a question in which the target subject is not associated with the target characteristic). Afterwards, the answer constraint model is introduced to verify whether the content of the answer determined by the starting position and the ending position of the answer in the target text is associated with the target characteristic. If the content of the answer is not associated with the target characteristic, the content of the answer is removed, thereby increasing the accuracy of answer recognition. At the same time, characteristics of the knowledge base are added, thereby further improving the accuracy of extracting the answer of the question from the text content.

Embodiment 5

Figure 8:
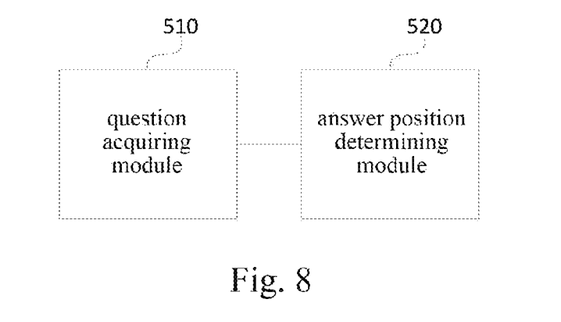
FIG. 8 is a structural block diagram of an apparatus for mining general text content provided in Embodiment 5 of the present disclosure.

FIG. 8 is a structural block diagram of an apparatus for mining general text content provided in Embodiment 5 of the present disclosure. The apparatus may perform the method for mining general text content according to any embodiment of the present disclosure, and possess functional modules for performing the method and corresponding beneficial effects. As shown in FIG. 8, the apparatus may include:

a question acquiring module 510, configured to acquire a question including a target subject and a target characteristic; and an answer position determining module 520, configured to input the target subject, the target characteristic and a target text into a pre-constructed answer prediction model, and determine a starting position and an ending position of an answer to the question in the target text by the answer prediction model, the answer prediction model being pre-trained based on a sample question including a sample subject and a sample characteristic, and a starting position and an ending position of a sample answer in a text.

By inputting the acquired question including the target subject and the target characteristic and the target text into the pre-constructed answer prediction model, the apparatus for mining general text content provided by the embodiment of the present disclosure may correctly predict the starting position and the ending position of the answer in the target text, thereby increasing the accuracy of answer recognition. At the same time, since characteristics of a knowledge base are added, the accuracy of extracting the answer of the question from the text content may be improved.

Further, the apparatus may further include:

a subject characteristic comparing module, configured to use the target subject and the target characteristic as inputs of a question recognition model after the question including the target subject and the target characteristic is acquired, compare a word vector of the target subject, a type of the target subject determined according to a knowledge base, and a candidate characteristic of the target subject determined according to the knowledge base, with the target characteristic by the question recognition model, and determine, based on the comparison result, whether the target subject is associated with the target characteristic; and stop the operation if the target subject is not associated with the target characteristic.

Alternatively, the answer prediction model may sequentially include an input layer, a bidirectional LSTM layer, an attention layer, a two-layer bidirectional LSTM layer, and an output layer. The attention layer is used to perform bidirectional matching between the question and the target text.

For example, the apparatus may further include:

an answer content determining module, configured to determine content of the answer based on the starting position and the ending position of the answer in the target text, after the starting position and the ending position of the answer of the question in the target text are determined by the answer prediction model; and a content-characteristic association determining module, configured to use the content of the answer and the target characteristic as a pre-constructed answer constraint model, and determine whether the content of the answer is associated with the target characteristic by the answer constraint model; and remove the content of the answer if the content of the answer is not associated with the target characteristic.

Embodiment 6

Figure 9:
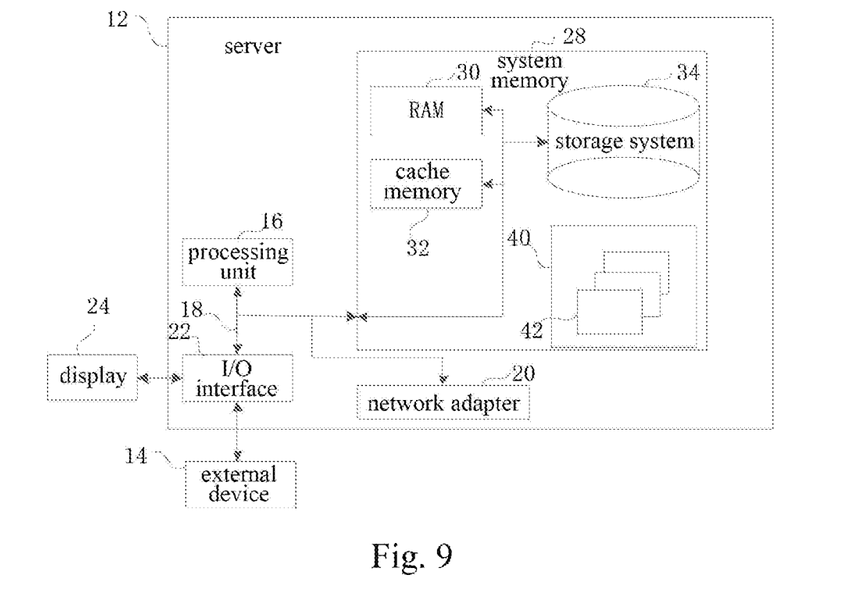
FIG. 9 is a schematic structural diagram of a server provided in Embodiment 6 of the present disclosure.

FIG. 9 is a schematic structural diagram of a server provided in Embodiment 6 of the present disclosure. FIG. 9 illustrates a block diagram of a server 12 adapted to implement implementations of the present disclosure. The server 12 shown in FIG. 9 is merely an example, and should not impose any limitation on the functions and the scope of use of the embodiments of the present disclosure.

As shown in FIG. 9, the server 12 is expressed in the form of a general-purpose computing device. Components of the server 12 may include, but are not limited to: one or more processors or a processing unit 16, a system memory 28, and a bus 18 connecting different system components (including the system memory 28 and the processing unit 16).

The bus 18 represents one or more bus structures, including a memory bus or a memory controller, a peripheral bus, a graphics acceleration port, a processor, or a local bus of any one of the bus structures. For example, the system structures include, but are not limited to, an industrial standard architecture (ISA) bus, a micro channel architecture (MAC) bus, an enhanced ISA bus, a Video Electronics Standards Association (VESA) local bus, and a peripheral component interconnection (PCI) bus.

The server 12 typically includes multiple computer system readable media. These medias may be any available media that can be accessed by the server 12, including volatile media, non-volatile media, removable media and non-removable media.

The system memory 28 may include a computer system readable medium in the form of a volatile memory, such as a random access memory (RAM) 30 and/or a cache memory 32. The device 12 may further include other removable/non-removable, volatile/non-volatile computer system storage media. By way of example only, a storage system 34 may be used for reading from and writing in non-removable and non-volatile magnetic media (not shown in FIG. 9, usually known as a "hard drive"). Although not shown in FIG. 9, a disk drive for reading from and writing in a removable non-volatile disk (such as a "floppy disk") and an optical driver for reading from and writing in a removable non-volatile disk (such as CD-ROM, DVD-ROM or other optical media) may be provided. With such arrangements, each driver may be connected to the bus 18 through one or more data media interfaces. The memory 28 may include at least one program product, the program product has a set of (e.g., at least one) program module, and the program module is configured to execute the functions of the embodiments of the disclosure.

A program/utility tool 40 with a set of (at least one) program module 42 may be stored in, e.g., the memory 28. The program module 42 includes, but is not limited to, an operating system, one or more applications, other program modules, and program data. Each of these examples or a combination thereof may include implementation of a network environment. The program module 42 usually executes the functions and/or methods according to the embodiments of the disclosure.

The server 12 may also communicate with one or more external devices 14 (e.g., a keyboard, a pointing device, and a displayer 24), and may also communicate with one or more devices that enable a user to interact with the server 12, and/or communicates with any other device (e.g., a network card and a modem) that enables the server 12 to communicate with one or more of other computing devices. This communication may be performed through an input/output (I/O) interface 22. Moreover, the server 12 may further communicate with one or more networks (e.g., a local area network (LAN), a wide area network (WAN) and/or a public network such as the Internet) through a network adapter 20. As shown in the FIG. 9, the network adapter 20 communicates with other modules of the server 12 through the bus 18. It should be appreciated that, although not shown in the figure, other hardware and/or software modules may be used in conjunction with the server 12, including but not limited to: a microcode, a device driver, a redundancy processing unit, an external disk drive array, a RAID system, a tape driver, and a data backup storage system.

By executing a program stored in the system memory 28, the processing unit 16 performs various function applications and data processing, for example, the method for mining general text content provided by the embodiments of the present disclosure.

Embodiment 7

Embodiment 7 of the present disclosure further provides a computer readable storage medium storing a computer program. The program, when executed by a processor, may implement the method for mining general text content according to any of the above embodiments.

The computer storage medium according to the embodiments of the disclosure may use any combination of one or more computer readable medium. The computer readable medium may be a computer readable signal medium or a computer readable storage medium. The computer readable storage medium may bey, for example but not limited to, an electric, magnetic, optical, electromagnetic, IR or semiconductor system, device or unit, or any combination thereof. More specific examples (non-exhaustive list) of the computer readable storage medium include: an electrical connection having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination thereof. Herein, the computer readable storage medium may be any tangible medium containing or storing programs, which may be used by an instruction execution system, device or unit, or a combination thereof.

The computer readable signal medium may be a data signal included in the baseband or transmitted as a part of carrier wave, and carries computer readable program codes. The data signal may be transmitted in multiple forms, including but not limited to an electromagnetic signal, an optical signal or any appropriate combination thereof. The computer readable signal medium may also be any computer readable medium rather than a computer readable storage medium, and the computer readable medium may send, spread or transmit programs to be used by an instruction execution system, device or unit, or a combination thereof.

Program codes contained in the computer readable medium may be transmitted using any suitable medium, including but not limited to: wireless, wire, cable, RF, etc., or any appropriate combination thereof.

A computer program code for executing the operations according to some embodiments of the disclosure may be written in one or more programming languages or a combination thereof. The programming language includes an object-oriented programming language, such as Java, Smalltalk and C++, and further includes a general procedural programming language, such as "C" language or a similar programming language. The program codes may be executed entirely on a computer of a user, executed partially on a computer of a user, executed as a standalone package, executed partially on the computer of the user and partially on a remote computer, or executed entirely on the remote computer or a server. When the remote computer is involved, the remote computer may be connected to a user computer through any type of network, including a local area network (LAN) or a wide area network (WAN), or be connected to an external computer (e.g., connected through Internet provided by an Internet service provider).

The sequence number of the above embodiments are only for the purpose of description, and do not represent effects of the embodiments.

It should be understood by those skilled in the art that the various modules or steps of some embodiments of the present disclosure may be implemented by a general-purpose computing device. The various modules or steps may be integrated in a single computing device or distributed on a network consisting of a plurality of computing devices. Alternatively, the various modules or steps may be implemented by executable program codes of the computing device, so that the various modules or steps may be stored in the storage device to be executed by the computing device, or may be implemented by respectively fabricating the various modules or steps into various integrated circuit modules, or by fabricating a plurality of modules or steps thereof into a single integrated circuit module. Thus, the present disclosure is not limited to any specific combination of hardware and software.

Each embodiment in the specification is described in a progressive mode. Parts emphasized in the each embodiment are different from that of other embodiments, and reference may be mutually made to the same or similar parts between the embodiments.

The foregoing is only a description of the preferred embodiments of the present disclosure, and is not used to limit the present disclosure. It should be appreciated by those skilled in the art that various modifications and changes may be made to the present disclosure. Any modification, equivalent substitution, improvement, etc. made within the spirit and the principles of the present disclosure should be included within the scope of protection of the present disclosure.

What is claimed is:

1. A method for mining general text content, comprising:
   acquiring a question including a target subject and a target characteristic;
   inputting the target subject and the target characteristic into a question recognition model, to determine whether the target subject is associated with the target characteristic, wherein the question recognition model converts the target subject into a word vector of the target subject, determines a type of the target subject and candidate characteristics of the target subject according to a knowledge base, merges the word vector, the type and the candidate characteristics of the target subject determined according to the knowledge base to obtained a merged object, compares the merged object with the target characteristic, and determines, based on a result of the comparison, whether the target subject is associated with the target characteristic;
   in response to the question recognition model outputting the target subject being associated with the target characteristic, performing operations comprising inputting the target subject, the target characteristic and a target text into a pre-constructed answer prediction model, and determining, in the target text, a starting position and an ending position of an answer to the question by the answer prediction model, the answer prediction model being pre-trained based on a sample question including a sample subject and a sample characteristic, and a starting position and an ending position of a sample answer in a text; and
   in response to the question recognition model outputting the target subject being not associated with the target characteristic, stopping the operations,
   wherein the method is performed by at least one processor.

2. The method according to claim 1, wherein the answer prediction model sequentially includes an input layer, a bidirectional LSTM layer, an attention layer, a two-layer bidirectional LSTM layer, and an output layer, and the attention layer is used to perform bidirectional matching between the question and the target text.

3. The method according to claim 1, wherein after the determining a starting position and an ending position of an answer to the question in the target text by the answer prediction model, the method further comprises:
   determining content of the answer based on the starting position and the ending position of the answer in the target text;
   using the content of the answer and the target characteristic as a pre-constructed answer constraint model, and determining whether the content of the answer is associated with the target characteristic by the answer constraint model; and
   removing the content of the answer in response to the content of the answer being not associated with the target characteristic.

4. The method according to claim 1, wherein the target subject is a matching subject in a knowledge graph obtained by matching the question with subjects in the knowledge graph, and the target characteristic is a matching characteristic in the knowledge graph obtained by matching the question with characteristics of the target subject in the knowledge graph.

5. An apparatus for mining general text content, comprising:
   at least one processor; and
   a memory storing instructions, the instructions when executed by the at least one processor, cause the at least one processor to perform operations, the operations comprising:
   acquiring a question including a target subject and a target characteristic;
   inputting the target subject and the target characteristic into a question recognition model, to determine whether the target subject is associated with the target characteristic, wherein the question recognition model converts the target subject into a word vector of the target subject, determines a type of the target subject and candidate characteristics of the target subject according to a knowledge base, merges the word vector, the type and the candidate characteristics of the target subject determined according to the knowledge base to obtained a merged object, compares the merged object with the target characteristic, and determines, based on a result of the comparison, whether the target subject is associated with the target characteristic;
   in response to the question recognition model outputting the target subject being associated with the target characteristic, performing processing comprising inputting the target subject, the target characteristic and a target text into a pre-constructed answer prediction model, and determining, in the target text, a starting position and an ending position of an answer to the question by the answer prediction model, the answer prediction model being pre-trained based on a sample question including a sample subject and a sample characteristic, and a starting position and an ending position of a sample answer in a text; and
   in response to the question recognition model outputting the target subject being not associated with the target characteristic, stopping the processing.

6. The apparatus according to claim 5, wherein the answer prediction model sequentially includes an input layer, a bidirectional LSTM layer, an attention layer, a two-layer bidirectional LSTM layer, and an output layer, and the attention layer is used to perform bidirectional matching between the question and the target text.

7. The apparatus according to claim 5, wherein after the determining a starting position and an ending position of an answer to the question in the target text by the answer prediction model, the operations further comprise:
   determining content of the answer based on the starting position and the ending position of the answer in the target text; and
   using the content of the answer and the target characteristic as a pre-constructed answer constraint model, and determining whether the content of the answer is associated with the target characteristic by the answer constraint model; and removing the content of the answer in response to the content of the answer being not associated with the target characteristic.

8. A non-transitory computer readable storage medium storing a computer program, wherein the computer program, when executed by a processor, cause the processor to perform operations, the operations comprising:

acquiring a question including a target subject and a target characteristic;

inputting the target subject and the target characteristic into a question recognition model, to determine whether the target subject is associated with the target characteristic, wherein the question recognition model converts the target subject into a word vector of the target subject, determines a type of the target subject and candidate characteristics of the target subject according to a knowledge base, merges the word vector, the type and the candidate characteristics of the target subject determined according to the knowledge base to obtained a merged object, compares the merged object with the target characteristic, and determines, based on a result of the comparison, whether the target subject is associated with the target characteristic;

in response to the question recognition model outputting the target subject being associated with the target characteristic, performing processing comprising inputting the target subject, the target characteristic and a target text into a pre-constructed answer prediction model, and determining a starting position and an ending position of an answer to the question in the target text by the answer prediction model, the answer prediction model being pre-trained based on a sample question including a sample subject and a sample characteristic, and a starting position and an ending position of a sample answer in a text; and in response to the question recognition model outputting the target subject being not associated with the target characteristic, stopping the processing.

* * * * *